Patented Nov. 15, 1938

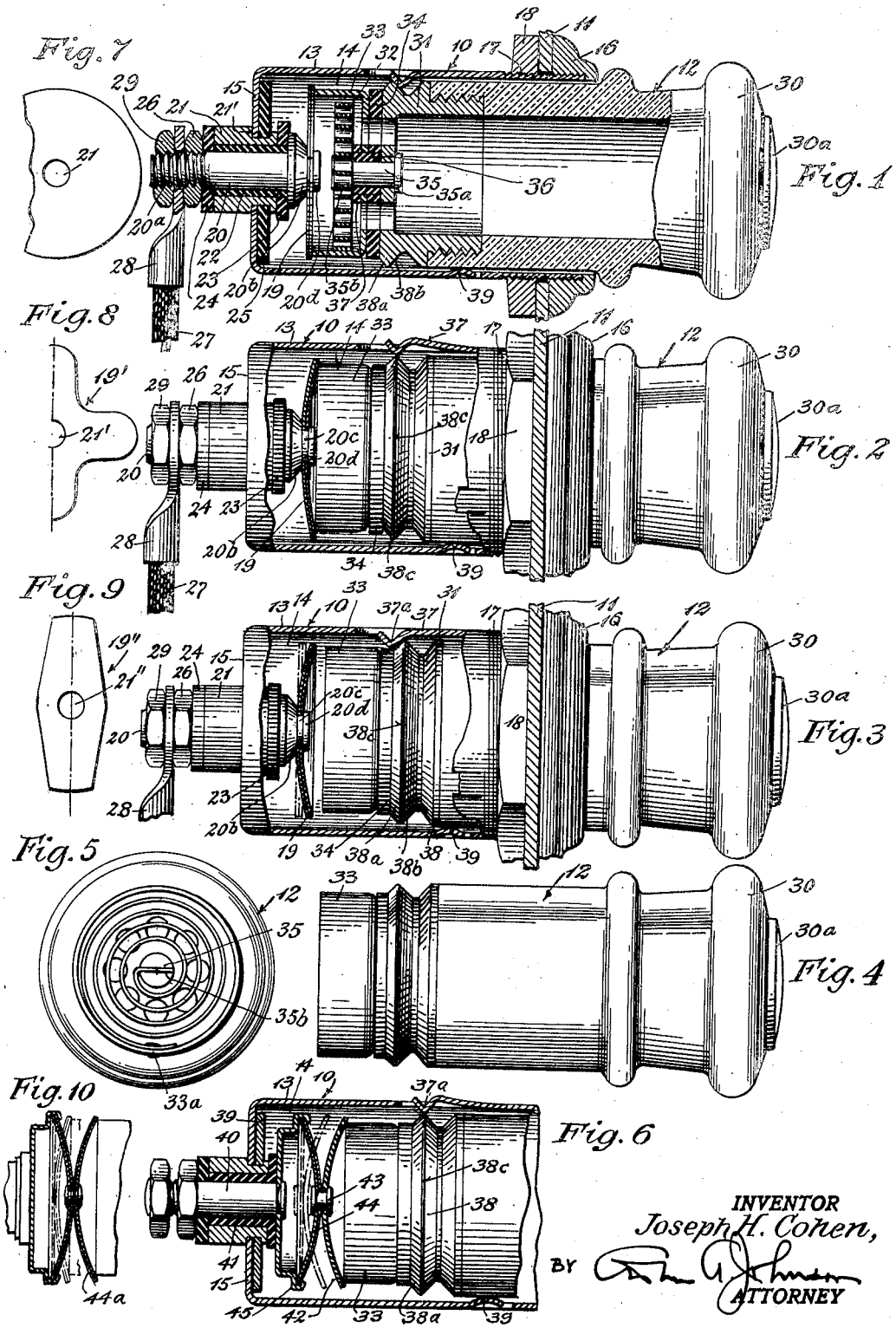

2,137,195

UNITED STATES PATENT OFFICE 2,137,195

CIGAR LIGHTER

Joseph H. Cohen, Bridgeport, Conn., assignor to Automatic Devices Corporation, Bridgeport, Conn., a corporation of Connecticut Application May 8, 1936, Serial No. 78,535

20 Claims. (Cl. 219—32)

This invention relates to electric cigar lighters, and, more particularly, to devices of this character for use with automobiles, although it is applicable for home, office and other similar use.

More specifically, the type of lighter to which this invention pertains is that wherein a thermostatic means is incorporated, so operating that when the removable igniting unit is in a socket and positioned therein for electrical energization of the heating element of said unit, the unit is held in such position until its element is heated to a predetermined extent. In previous lighters of this kind, on such heating of the unit, the thermostatic means releases the unit so that it can be easily manually slipped out of the socket,—or the thermostatic means thus releases the unit and at the same time allows a spring, tensioned by the last previous insertion of the unit in the socket, to relieve such tension, and thereby partially eject the unit,—or the thermostatic means permits such spring tension to readjust the unit in the socket thereby to release the unit for manual removal.

According to the present invention, a novel and valuable lighter is provided wherein a thermostatic means is employed, but wherein this means acts, when the heating element of the removable igniting unit is heated to a predetermined extent, to break the energizing circuit for the unit, and, incidental to this action, to move said unit for abnormal protrusion from its socket.

In satisfaction of another object of the invention, there is provided, as a part of the combination last-described, a resilient instrumentality acting also to move the unit outwardly of the socket. Preferably, this instrumentality is normally so resilient as to effect the actuation just described, and consequently not having to be tensioned for that actuation each time the unit is inserted in the socket. Preferably, also, said instrumentality operates in such manner that the thermostatic means first moves the unit to a certain degree of protrusion from the socket, and then said resilient instrumentality moves the unit further and to a more noticeable degree of protrusion from the socket.

Another object is to provide a lighter having means for automatically breaking the energizing circuit and simultaneously moving the unit toward protrusion from its socket, such means acting to give the unit a sharp thrust toward protrusion so as to shoot the unit outwardly of the socket with some velocity, in combination with means for slowing down this outward movement of the unit thereby to guard against accidental ejection of the unit from the socket. Preferably, said automatic means includes a thermostatic means and a coadjuvant means; the first for breaking the circuit and simultaneously moving the unit toward protrusion from the socket on the attainment by the heating element of a predetermined degree of heat, and the second for giving the unit a thrust toward further protrusion from the socket.

Still a further object is to provide a means, and a means including a heat-responsive instrumentality, as a thermostat, and means having the characteristics following, to wit: Said means so operates that as the heat-responsive element becomes more and more heated the same will move the unit more and more toward protrusion, but comparatively slowly, up to a prevised point. When the unit has been protruded to the extent just mentioned, the same comes in a particular way into the field of action of an auxiliary, which auxiliary is preferably a resilient element always resilient; that is, then the unit is brought to a position such that said auxiliary is ready to apply a thrust to the unit to move the same, comparatively rapidly, toward further and more noticeable protrusion from the socket. However, the parts are so arranged that the unit, during its aforesaid first comparatively slow protrusive movement in the socket, is also brought into the field of action of said auxiliary, and in such a way that should an imperfect contact be prevailing between the unit and the leads from the energizing circuit, said auxiliary will act effectively toward overcoming such poor contact.

Still another object is to provide a thermostatically operated lighter wherein the thermostatic means is of a generally simplified and easily installed type and at the same time particularly efficient and dependable in operation.

Various other objects and advantages will be hereinafter referred to or become apparent.

The invention will be more clearly understood from the following description, when taken in connection with the accompanying drawing showing an embodiment of the invention as at present preferred.

In this drawing, wherein the parts are drawn to about twice the scale of the commercial device as now designed:

Figure 1 is an axial sectional view, with the removable igniting unit in operative or energizing position in the socket.

Fig. 2 is a similar view, with fewer parts in section, and showing the igniting unit in a partially protruded position brought about as the result of the heating element reaching a state of incandescence just short of that predetermined to be attained before removal of the unit.

Fig. 3 is a view like Fig. 2, except that the igniting unit is shown in a further protruded position, beyond the limit of its protrusion by the thermostatic means, such further protrusion having been effected by an auxiliary to said thermostatic means,—Fig. 3 also showing the igniting unit in normal or inoperative position.

Fig. 4 is a side elevation of the igniting unit removed from the socket.

Fig. 5 is an end elevation of such unit, looking toward the right in Fig. 4.

Fig. 6 is a fragmentary view, partially in section and partially in elevation, and illustrating a modification according to which the thermostatic means engages the igniting unit indirectly or through an intermediary element; this view showing the unit protruded to a certain extent.

Fig. 7 is a face view, partially broken away, of the thermostatic means of Figure 1, removed.

Fig. 8 is a face view of a one-half portion of a modified form of thermostat incorporating a feasible variation in outline from the circular outline characteristic of the thermostat of Fig. 7.

Fig. 9 is a similar view of another modified form of thermostat incorporating another feasible variation in outline from the circular outline characteristic of the thermostat of Fig. 7.

Fig. 10 is a fragmentary view, similar to Fig. 9, illustrating a further modification.

The cigar lighter of the present invention, in the exemplary embodiment thereof shown in the drawing, is of the so-called sleeve type, for use in automobiles, and comprises a socket-carrying base member 10 for attachment to a panel 11 of an automobile, and a removable igniting unit 12 which is normally supported by the base member, but which may be mechanically and electrically disconnected for manual transportation within the car and for handling by various occupants therein for the purpose of lighting cigars, cigarettes and the like.

Before taking up in further detail the illustrative structures shown in the drawing, it should be explained that the removable igniting unit 12, as the parts are so shown, would ordinarily rest in the base member 10 so as slightly to protrude therefrom as indicated in Fig. 3, and the unit would be in the fully inserted position shown in Figure 1 only when manually thus disposed by a person desiring to place the unit in operating position, or energizing position for its heating element, thereby to condition the unit for removal from said base member and manual handling to light a cigar or cigarette.

Referring now particularly to the illustrated embodiment of Figures 1 to 7, the base member 10 as shown comprises a sleeve 13 forming a deep socket 14, such sleeve closed at its inner end by an integral transverse wall 15. This sleeve is adapted to pass through a suitable aperture in the selected panel 11, and is held in this position by a flange-piece or cap 16 screwed onto the outer end of the sleeve. The thread 17 which takes this cap has also threaded thereon a nut 18. In mounting such a base member, it is convenient to have the cap 16 removed but the nut 17 in place, so that the outer end of the sleeve over a length thereof ahead of the nut can be inserted endwisely into the panel opening from the rear of the panel, and so that after such length is inserted through said opening, the cap 16 can be applied and screwed up tight, and, after this, the nut can be screwed up against the rear of the panel to clamp the base member securely in position.

The base member 10, preferably formed of sheet metal, serves as a conductive element of the grounded portion of the circuit for the energizing current when the removable igniting unit is in operating position in the socket 14.

Said base member 10 carries a contact 19 suitably insulated.

This contact in its present preferred form is a circular disk as shown in Figures 1 and 7, or a cruciform plate, as indicated at 19' in Fig. 8, or an elongate strip, as indicated at 19" in Fig. 9—the dot-and-dash lines in these two last-mentioned view representing center-lines. Such a contact, as illustrated in the case of the circular disk, is conveniently mounted on a metal stud 20. As shown this stud has a shank the rear end of which is threaded at 20a, and carries at its front end an enlarged head 20b having a cylindrical reduced extension 20c for taking a preferably centrally located circular hole (21, 21' or 21", in Figs. 7, 8 and 9 respectively) in the contact; the outer end of this extension 20c being headed-over as at 20d so as suitably to anchor the contact in place.

The stud 20 is supported in a shouldered metal sleeve 21, but insulated therefrom and from the base member 10 by an insulation sleeve 22 between the stud-shank and the sleeve 21, by a washer 23 between the stud-head 20b and the adjacent end of the sleeve 21, by a similar washer 24 at the other end of the sleeve 21, and by an annular disk 25 of insulating material between the wall 15 at the inner end of sleeve 13 and the headed-over inner end of sleeve 21. The heading-over of such end rivets the sleeve 21 securely in place on the base member 10, due to the shoulder 21' of the sleeve; the reduced portion of said sleeve, ahead of this shoulder, passing with snug fit through the central opening of the disk 25 and through a matching aperture in the wall 15.

Stud 20 is rigidly secured in sleeve 21, by application of a primary nut 26 to the threaded end 20a of the stud. A feed wire 27 is connected to the stud by a terminal clip 28, the latter being clamped in place by tightening up a secondary nut 29 on the threaded end of the stud.

Thus the base member 10 is provided with contact members (the socket sleeve 13 and the contact 19) terminating at both sides of the car circuit, and insulated from each other.

The removable igniting unit 12 is shown as including a knob or handle 30 and a plunger section therebeyond adapted to fit slidingly in the socket 14 for supporting the igniting unit therein. This handle is here part of a hollow tube of suitable insulating material, and within the inner end of this tube is secured a hollow metal carrier 31 for a heating element 32 and for a metal cup 33 within which said element is positioned.

This cup 33, and a centrally apertured insulating disk 34, are clamped on the inner end of carrier 31, by means of a stud 35, headed-over at 35a within the cup, and carrying a slotted or kerfed head 35b beyond the rear end of an insulating collar 36; this collar and an insulating washer 37 combining with the disk 34 to insulate the metal cup 33 from the socket sleeve 13 leading to ground, except by way of the heating element 32 as will now be explained. Said heating element is in the present case in the form of a nichrome or other suitable resistance element present as a spirally wound band connected at its outer end to cup 33 at 33a (Fig. 5) and at its inner end set in the kerf of head 35b of the stud 35.

As indicated at 36 in Figures 1 and 5, washer 34, the bottom wall of the cup 33 and a corresponding wall of carrier 31, are matchingly apertured at a plurality of points around stud 35, so that when desired, a translucent portion 30a of handle 30 may become illumined from the glow of heating element 32 as the latter reaches incandescence, thus to give a visual signal that the removable igniting unit 12 is ready, or approaching readiness, for removal from socket 14.

The heating element 32 is thus heated only while the contact 19 is contacting the cup 33, this following from the description of the parts as so far given. As has already been explained, the unit 12 is normally in inoperative position, that is, the contact 19, normally extended as shown in dot-and-dash lines in Fig. 3, is separated from the cup 33 when the unit is slightly projected from the socket 14 as shown in said view.

In order to hold the unit in operating position, a detent means is provided, partially carried by the unit and partially carried by the base member 10. In the present case this means, so embodied that it not only performs as such detent but has other important functions hereinafter explained, comprises a tongue 37 lanced from the side wall of the base member 10, a V-shaped bend 37a in such tongue, and a conical wall 38a of a collar 38 on carrier 31. Tongue 37 is resiliently biased to the position shown in Figure 1 and is, in effect, a leaf spring. Said V-shaped bend will hereinafter be called the tooth 37a. The conical wall 38a will hereinafter be called the ouster wall 38a, since it has a plurality of functions an important one of which is to urge the unit toward protrusion. The oppositely flared wall of collar 38, since it has a plurality of functions, an important one of which is to insure the attainment by element 32 of a prevised heat before a release of the unit 12 to the protrusive action of wall 38a, will hereinafter be called the monitor wall 38b.

Normally, that is, with the parts arranged as in Fig. 3, the tooth 37a engages the ouster wall 38a in such manner that said tooth and wall coact as a detent couple to hold the unit 12 in inoperative position, impositively but with sufficient security to preclude accidental or casual further insertion of the unit.

When it is desired thus to insert the unit, so as to place the heating element 32 in circuit as shown in Figure 1, the knob 30 is pushed in, bringing the tooth 37a over the crest 38c of collar 38 as shown in Fig. 2, and dropping the tooth to hook over, and lie outwardly of and against, the monitor wall 38b as shown in Figure 1.

The contact 19 is here a thermostatic means, in the form of a bimetallic plate as shown; and is preferably thus embodied whether such contact be of circular outline, or of the cruciform or strip nature illustrated in Figs. 8 and 9, or otherwise constituted in accordance with the invention. Preferably, any such contact is substantially uniplanar in normal or unheated condition. As shown the contact 19 is desirably perfectly flat in such condition. The metals of differing coefficients of expansion are so arranged that when the contact is heated, it bellies or becomes dished as shown in Figs. 2 and 3, thus deforming more and more as the temperature rises higher and higher.

Consequently, once the unit 12 is manually pushed into its socket from the normal or inoperative position of Fig. 3, so as to become inserted further and to the extent shown in Figure 1, and is there caught and held as the result of tooth 37a having been snapped over the crest 38c of collar 38 so as now to dispose the hook outwardly of and against the monitor wall 38b, approach of the heating element 32 toward incandescence or toward attainment of the desired heat to be set up therein, causes the contact 19 to become deformed out of the flat, in a manner to exert an end thrust on the cup 33. This thrust action, and the fact that the origin thereof is a heat-responsive deformation of the contact 19 (or of any substitute thermostatic means) is one of the important features of the present invention.

Such end thrust tends to move the unit 12 outwardly of the socket 14. This movement is resisted by the resiliency of spring 37, as outward movement of the unit 12 relative to the socket 14 can occur only incidental to a riding up of the tooth 37a over the monitor wall 38a. And this action of said wall and said tooth, is exemplary of another of the important features of the present invention. As indicated by the phrase just employed, any equivalent arrangement is intended to come within the invention, whether provided solely as a feature to perform the function to be next mentioned, or, as here, provided for that function and the stop-function already described, or otherwise. Said feature is the provision of a monitor or contact supervising means, as will now be explained. During approach of the heating element 32 toward incandescence, not only is the contact 19 varied more and more toward the deformation shown in Fig. 2, but all during this stage of operation the contact between thermostatic element 19 and the cup 33 is a pressure-maintained one. This pressure in the structure illustrated actually increases rather than decreases as the heating element and the thermostatic contact 19 become hotter and hotter. If during this heating stage a poor contact should develop between the parts 19 and 33, as by a shifting thereof relatively, the falling in of a dust particle, or for any other reason, the monitor wall 38b lives up to its name and coacts with the tooth 37a to send the cup 33 back tight against the contact 19 even as the same flattens out due to cooling in agreement with the cooling of the heating element 32 because of such a poor contact developing as to rob the latter of the prevised current. The contact 19, it will be noted, is located quite close to the heating element 32, for quick heat transmission from the latter to the former, by conduction, convection and direct radiation.

When the heating element 32 is heated to the intended extent, the thrust of the thermostatic means (such thrust in the structure now being described exerted directly by said means since here one of the two contacts 19 and 33 is itself a thermostat) has so progressed that the unit 12 is protruded from the socket 14 to a point just beyond that illustrated in Fig. 2; that is, the crest 38c of the collar 38, on which crest the V-apex of the tooth 37a is seen to be resting in Fig. 2, is carried beyond such apex. Immediately this occurs, said tooth and the ouster wall 38a coact, due to the resiliency of tongue or spring 37, as a coadjuvant means or auxiliary to the thermostatic means in the complete means for moving the unit 12 to the full intended protrusion thereof from the socket. This full protrusion is one to a noticeable extent; and at the same time, when the translucent element 30a or an equivalent is present and the interior of the unit is hollow and in such manner as to transmit the flow of incandescence of the heating element, as already described, an additional and attention-arresting signal will be given at said element 30a. There will be given not only these two visual signals that the unit is ready for removal for use, but also an audible one, to wit, the clicking sound made by tongue 37 in snapping down against the crest 38c of collar 38 at the conclusion of the swift descent of the tooth 37a down along the ouster wall 38a.

The auxiliary protrusion means here shown as incorporated in a couple consisting of the resiliently biased tooth 37a in the socket and the ouster wall 38a on the igniting unit, and desirably having the characteristic, as it has in the present case, of not only giving a protrusive movement to the unit additional to that given it by the thermostatic means but also of then moving the unit as the result of a suddenly applied thrust and consequently with considerable speed as compared to the speed of the movement of the unit in response to the gradually increasing and fairly slowly applied thrust of the thermosatic means, is exemplary of another of the important features of the present invention. As indicated by the phrase just used, any equivalent arrangement is intended to come within the invention, whether provided solely as a feature to perform the function last-above mentioned, or, as here, provided for that function and also to act as a detent as already described for holding the parts 19 and 13 in contact once the unit has been manually pushed into energizing position as in Figure 1, or otherwise.

In order that the action of the auxiliary protrusion means here including the tooth 37a and the ouster wall 38a on the igniting unit, shall not be effective to eject the unit from the socket, the velocity of outward projection of said unit from the position shown in Fig. 2 to that shown in Fig. 3 and resulting from the action of said auxiliary protrusion means, is checked, in the structure shown, by a friction element 39. This element is here an inwardly convexed short tongue, as illustrated, lanced, and resiliently inwardly biased, from socket sleeve 13.

Referring to the modification shown in Fig. 6, the parts here given the same reference characters as in Figures 1 to 4, correspond in structure and operation to the similarly numbered parts in the latter views. Other structural changes, aside from the mounting for the thermostatic means employed, and the action of this means in thrusting the unit 12 for partial protrusion from the socket 14, are unimportant; it being noted in this connection that instead of the insulated disk 25 of Fig. 1 a thinner metal disk 39 is used, that the stud 40 corresponding to the stud 20 of Figure 1 does not include an enlarged head as at 20b in Figure 1, and that the insulation between the main length of said stud and the sleeve 21 is in Fig. 6 in the form of a piece 41 including integrally a sleeve portion and a flange portion.

In the form of the invention shown in Fig. 6, the heating element (not shown) is carried within and connected to the metal cup 33 and also to a central stud (not shown) similar to the stud 35, as in Figure 1. Thus, here, too, the cup 33 is shown as one of two contacts to be brought together to place the heating element in the energizing circuit. The other such contact, however, is not, as in Figure 1, a thermostatic element, but another part carried thereby, to wit, a permanently dished metal plate 42. This contact 42 is centrally riveted, as at 43, to the center of the thermostatic element, here shown as a bimetallic disk 44 normally uniplanar as indicated in dot-and-dash lines and otherwise exactly like the element 19 of Figure 1 except that the disk 44 is secured peripherally. Such securement is in an annular groove or seat formed by flanges in the mouth of a shallow metal cup 45 riveted and tightly held in place on the inner end of stud 40 by heading over such end of the stud as illustrated.

In operation, the structure just described acts exactly like that of Figures 1 to 5, except for the differences already noted. In Fig. 6, the heat-responsive deformation of the thermostatic element 44 has progressed to a point where the V-apex of tooth 37a is atop crest 38c of collar 38 and is ready to snap down along the ouster wall 38a of said collar.

Here, as in Figure 1, the thermostatic element need not be a disk, but could be otherwise constructed, as for instance indicated in Fig. 8 or 9. So far as has been able to be observed, somewhat different actions occur as between a disk as shown in Fig. 7 and a spider such as the cruciform one of Fig. 9, where both are of a given diameter and are bimetallically alike; the disk having a lesser degree of bellying transformation, or "throw", but a greater strength of thrust, than a spider, with both equally heated. The present preference is for a disk. According to the invention, a disk, spider, strip, or the like, can be employed in multiple, to obtain as extensive a "throw" as desired. For instance, there could be substituted, for the dished plate 42 of Fig. 6, a bimetallic disk 44a having different metals so placed that while said disk could normally be substantially flat, the same would become more and more dished, in agreement with the illustrated direction of dishing of the plate 42, as it is more and more heated, all as shown in Fig. 10.

In all the constructions herein shown, it will be noted that an igniting unit is moved from a containing socket toward protrusion therefrom, by an end thrust against the unit, this thrust originating at a deformation of a heat-responsive instrumentality which becomes heated as the heating element of the unit is heated. Even when in carrying out the invention, a coadjuvant or follower unit-protrusive means is employed, there is no necessity for the incorporation of a special spring, in or on the unit or elsewhere, either having to be tensioned by a movement of the unit inwardly of the socket or provided solely for giving the unit a movement of protrusion from the socket. The thermostatic means of the present invention can be most conveniently made and installed, and then can impart its thrust lengthwisely of the unit and as the result of applying such thrust at points around the same so balanced that an even protrusive movement of the unit is always insured. The same ideal action can conveniently be a characteristic of the coadjuvant or follower unit-protrusive means, as is evident from the embodiment thereof herein described.

Variations and modifications may be made within the scope of this invention, and portions of the improvements may be used without others.

I claim:

1. In an electric cigar lighter, the combination of a base structure presenting a socket; an igniting unit insertable within and removable from such socket, said unit being manually movable in the socket to a deep position therein for energization of said unit; means including a thermostatic means for moving the unit outwardly of the socket during energization of the unit; and non-thermostatic means for then automatically further moving the unit outwardly of the socket.

2. In an electric cigar lighter, the combination of a base structure presenting a socket; an igniting unit insertable within and removable from such socket, said unit being manually movable in the socket to a deep position therein for energization of said unit; thermostatic means for moving the unit outwardly of the socket during energization of the unit; monitor means for moving the unit inwardly of the socket on unintended cooling of the thermostatic means; and ouster means for moving the unit further outwardly of the socket on completion by the unit of a predetermined outward movement effected by the thermostatic means.

3. A lighter as in claim 2, wherein said ouster means includes an impositive detent for holding the unit normally out of energizing position.

4. In an electric cigar lighter, the combination of a base structure presenting a socket for use; an igniting unit insertable within and removable from such socket for use, said unit being manually movable in the socket from a deenergized position to a deep position therein for energization of said unit; and heat-responsive means engaging the unit and rendered effective by movement of the unit to energizing position for moving the unit outwardly of the socket during energization of the unit and until it is energized to a predetermined extent and reaches said deenergized position.

5. In an electric cigar lighter, the combination of a base structure presenting a socket; an igniting unit insertable within and removable from such socket for use, said unit being manually movable in the socket from a deenergized position to a deep position therein for energization of said unit; and means for passing electric current through the unit to energize it when in energizing position, said means including a heat-responsive means engaging the unit which during energization of the unit forces the unit gradually outwardly of the socket and toward said deenergized position while the unit is being brought to the desired heat.

6. In an electric cigar lighter, the combination of a base structure presenting a socket; an igniting unit insertable within and removable from said socket for use, said unit being manually movable in the socket into a position in which an energizing circuit for the unit is established; means for passing electric current through the unit when in said position, including a contact carried by the unit and manually movable into engagement with a second contact; means for urging said contact into open-circuit position; means for holding the movable contact in engagement with said second contact when moved by the manual means; and heat-responsive means for moving the movable contact and unit toward open-circuit position against the holding means until the holding means is rendered inoperative and urging means moves the contact into open-circuit position, said heat-responsive means being remote from said urging means.

7. In an electric cigar lighter, the combination of a base structure presenting a socket; an igniting unit insertable within and removable from said socket for use, said unit being manually movable in the socket from a deenergized position to a deep position therein for energization of the unit to heat the same; means for holding the unit in circuit-closing position; and heat-responsive means for engaging and gradually pushing the unit outwardly of the socket away from said deep position against the holding means during energization of the unit to release the holding means, the pushing force applied to the unit being produced by the deformation resulting from the heating of the heat-responsive means.

8. In an electric cigar lighter, the combination of a base structure presenting a socket; an igniting unit insertable within and removable from such socket for use and movable from a deenergized position to a deep position therein for energization of said unit; means cooperating with a portion of the unit for moving the unit outwardly of the socket and cooperating with another portion of the unit for holding the same in energizing position when moved to that position; and heat responsive means acting on the unit for moving the unit outwardly of the socket to a position in which the first mentioned means is rendered ineffective to hold the unit in energizing position and becomes effective to move the unit outwardly to deenergizing position.

9. In an electric cigar lighter, the combination of a base structure presenting a socket; an igniting unit insertable within and removable from such socket for use, said unit being manually movable in the socket from a deenergized position to a deep position therein for energization of said unit; means for yieldingly resisting movement of the unit away from said deep position and outwardly of the socket toward said deenergized position until such movement has continued to a predetermined extent; and means responsive to energization of the unit and operative during its energization for moving the unit as last stated against the resistance of the means first-named, said moving means including an electrical contact engaging the unit to cause energization thereof and these parts being held to good electrical connection by the means first-named during operation of said moving means.

10. A lighter as in claim 9, in which there is a means, operative at the conclusion of the first-mentioned movement of the unit, to move the unit further outwardly of the socket thereby to break electrical connection between said contact and the unit.

11. In an electric cigar lighter, the combination of a base structure presenting a socket; an igniting unit insertable within and removable from such socket for use, said unit being manually movable in the socket from a deenergized position to a deep position therein for energization of said unit; and means for moving the same outwardly of the socket and from deep position toward deenergized position, said means including a plurality of thermostatic means arranged tandem-fashion in the socket and both deformable in response to energization of the unit and each then expanding lengthwise of the unit and outwardly thereof and one then being moved lengthwise of the unit and outwardly thereof by the expansion of the other.

12. In a cigar lighter, the combination of a socket; an igniting unit insertable within and removable from said socket for use, the unit being manually movable in the socket from a deenergized position to a deep position therein for energization of said unit; and means for moving the unit into deenergized position including heat-responsive means for applying a force to said unit for gradually moving the igniting unit from deep position in accordance with the heat thereof during the heating up of the same.

13. In an electric cigar lighter, the combination of a socket; an igniting unit insertable within and removable from said socket for use, the unit being manually movable in the socket from a deenergized position to a deep position therein for energization of said unit; and means for passing electric current through the unit to energize it when in energizing position, including a bimetallic thermostat in the socket wholly beyond the inner end of the unit when the latter is in deep position and operable to apply a force to the unit to move the unit outwardly during energization in accordance with the heat of said heating element.

14. In an electric cigar lighter, the combination of a socket; an igniting unit insertable within and removable from said socket for use, the unit being manually movable in the socket from a deenergized position to a deep position therein for energization of said unit; and means for passing electric current through the unit to energize it when in energizing position, including a bimetallic thermostat in the socket wholly beyond the inner end of the unit when the latter is in deep position and which moves the unit outwardly during energization in accordance with the heat of said heating element and a contact secured to the thermostat and adapted to contact the inner end of the unit.

15. In an electric cigar lighter, the combination of a socket; an igniting unit insertable within and removable from the socket for use, the unit being manually movable in the socket from a deenergized position to a deep position therein for energization of the unit, means cooperating with a portion of the unit when moved to an intermediate position on the socket for urging the unit to deenergized position and heat responsive means operable to apply a force to the unit upon the unit attaining the desired heat to push it outwardly from energizing position to the intermediate position in which the urging means becomes effective to move the unit to deenergized position.

16. In a cigar lighter, a holding device; an igniting unit having a heating element thereon; an energizing circuit for the heating element including a pair of contacts, one of said contacts being supported on the unit for manual movement into engagement with the other contact to close the energizing circuit; resilient means normally urging the supported contact into open-circuit position; means for engaging the support for the contact for maintaining the circuit closed when the contacts are in closed-circuit position; and bimetallic means in heat-receiving relation with the heating element separate from the resilient means and operable to push the support and contact toward open-circuit position until the means for maintaining the circuit closed is released and the resilient urging means moves the contact into open-circuit position.

17. In a cigar lighter, a holding device; an igniting unit having a heating element thereon; an energizing circuit for the heating element including a pair of contacts, one of said contacts being supported on the unit for manual movement into engagement with the other contact to close the energizing circuit; means normally urging the supported contact into open-circuit position; means for engaging the support for the contact for maintaining the circuit closed when the contacts are in closed-circuit position; and normally inactive heat-responsive means operable upon being heated to apply force to the support and contact to release the means for maintaining the circuit closed and permit the urging means to quickly move the contact into open-circuit position.

18. In a cigar lighter, a holding device; an igniting unit having a heating element thereon; an energizing circuit for the heating element including a pair of contacts, one of said contacts being supported by the unit for manual movement into engagement with the other contact to close the energizing circuit; means normally urging the supported contact into open-circuit position; means for engaging the support for the contact for maintaining the circuit closed when the contacts are in closed-circuit position; and thermostatic means having a normal position from which it flexes only upon being heated to apply force to the support and contact until the means for maintaining the circuit closed is released and the normal urging means moves the contact into open-circuit position.

19. In a cigar lighter, a holding device; an igniting unit having a heating element thereon; an energizing circuit for the heating element including a relatively fixed contact and a movable contact, the movable contact being supported on the igniting unit and manually movable into engagement with the relatively fixed contact to close the energizing circuit; means normally urging the movable contact into open-circuit position; means for maintaining the circuit closed when the contacts are moved into closed-circuit position; and a bimetallic disk adjacent the movable contact and adapted to flex when heated and move the movable contact until the means for maintaining the circuit closed is released and the urging means moves the contact into open-circuit position.

20. In a cigar lighter, a holding device; an igniting unit having a heating element thereon; an energizing circuit for the heating element including a relatively fixed contact and a movable contact mounted on the unit in coaxial alignment, the movable contact being manually movable into engagement with the relatively fixed contact to close the energizing circuit; means normally urging the movable contact into open-circuit position; means for maintaining the circuit closed when the contacts are moved into closed-circuit position; and a bimetallic disk in heat-receiving relation with the heating element mounted coaxially with the contacts and operable to move the movable contact until the means for maintaining the circuit closed is released and the urging means moves the contact into open-circuit position.

JOSEPH H. COHEN.